United States Patent [19]

Wirth

[11] 3,991,866
[45] Nov. 16, 1976

[54] DISCHARGE CHUTE STRUCTURE
[75] Inventor: Gary J. Wirth, Milwaukee, Wis.
[73] Assignee: Speaker Motion Systems, Inc., Milwaukee, Wis.
[22] Filed: Nov. 6, 1974
[21] Appl. No.: 521,336

[52] U.S. Cl. .............................. 193/2 R; 198/569
[51] Int. Cl.² ........................................ B65G 11/00
[58] Field of Search ................... 193/2 R, 2 C, 3, 4, 193/8, 38, 41; 198/38, 42, 43, 45, 65, 66, 68, 155, 185, 278, 279, 282; 209/85, 93, 123; 214/11 R

[56] References Cited
UNITED STATES PATENTS

| 1,093,815 | 4/1914 | Whittier | 198/45 X |
| 1,503,936 | 8/1924 | Benoit | 198/38 |
| 1,543,307 | 6/1925 | Wilson | 198/66 X |
| 1,731,783 | 10/1929 | Lippe | 193/4 |
| 2,311,501 | 2/1943 | Zoldok | 193/2 R X |
| 2,678,121 | 5/1954 | Phillips | 193/4 |
| 2,744,602 | 5/1956 | Aldred | 193/38 |
| 3,008,783 | 11/1961 | Roehl | 198/278 X |
| 3,147,845 | 9/1964 | Harrison | 198/38 |

FOREIGN PATENTS OR APPLICATIONS

| 148,148 | 6/1921 | United Kingdom | 193/2 R |
| 309,752 | 4/1929 | United Kingdom | 198/220 BA |

Primary Examiner—John J. Love
Assistant Examiner—James L. Rowland
Attorney, Agent, or Firm—Andrus, Sceales, Starke & Sawall

[57] ABSTRACT

A lateral discharge chute is located to receive various sized parcels from a tilt tray conveyor with sidewalls which direct the parcels onto a runout conveyor. The discharge chute includes an inclined base wall with the upper edge located immediately adjacent to the conveyor and an upstream wall which curves downwardly to a lateral discharge portion to provide a gradually changing guide surface. A downstream sidewall of the chute is formed with an incline in the direction of travel such that the engagement of the sidewall by the load tends to cause the leading end to ride up on the wall rather than jamming between the upstream and downstream walls. The downstream portion of the base wall is provided with a pair of raised plateaus with interconnecting turning walls between the plateaus and between the base and the first plateau. The turning walls are inclined in the direction of the load movement and are further angularly oriented from the conveyor in the direction of conveyor movement. The second downstream turning wall is at a slightly lesser angle than the first turning wall. The base and sidewall constructions each contribute to reliable discharge of parcels without jamming in the discharge portion.

23 Claims, 6 Drawing Figures

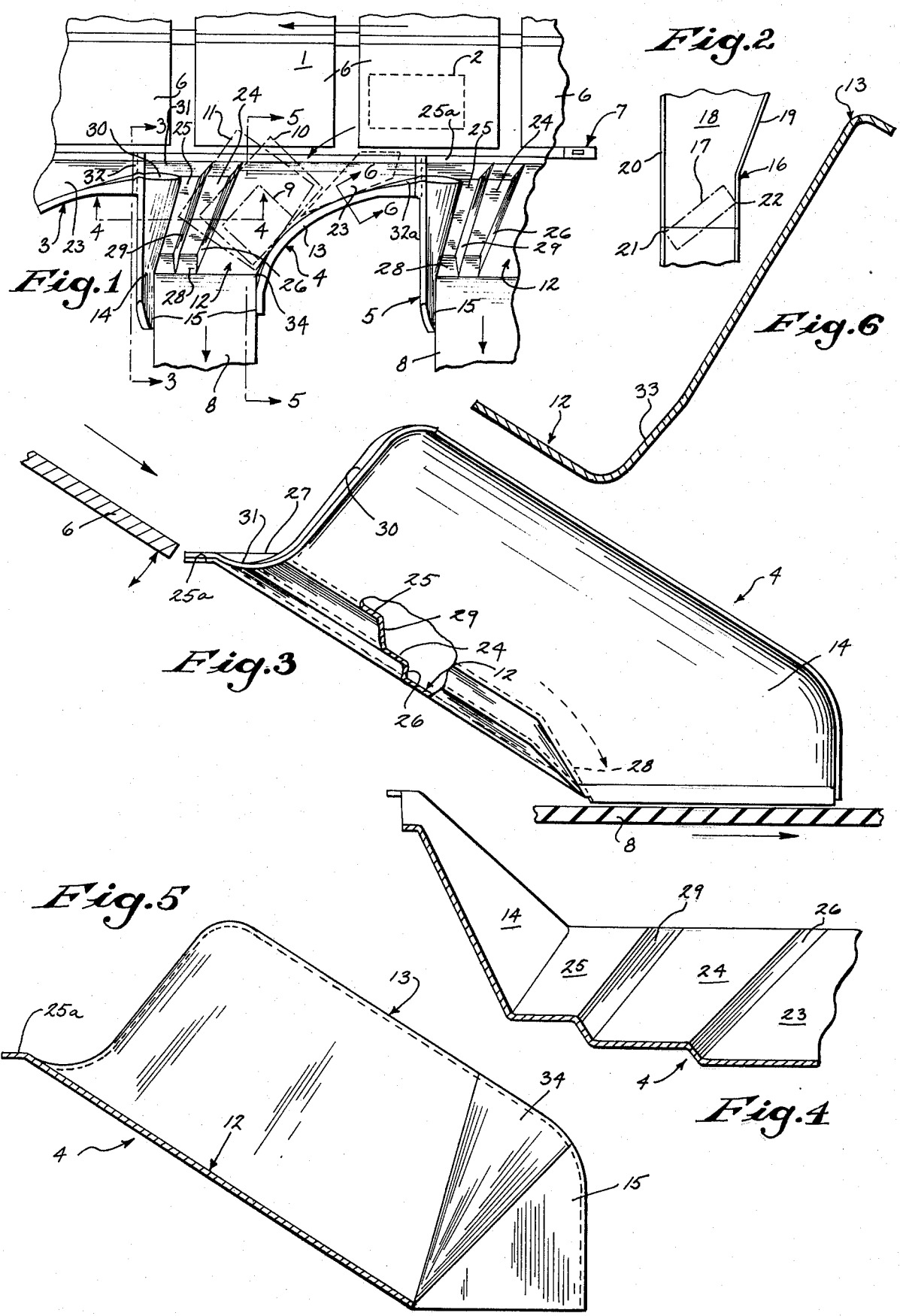

DISCHARGE CHUTE STRUCTURE

BACKGROUND OF THE INVENTION

This invention relates to a discharge chute apparatus for a high speed conveying system and particularly to a gravity discharge chute permitting lateral discharge from the conveying system in a minimum amount of space.

In high speed sorting of parcels, various conveyors are employed with automatic discharge means for discharging of the parcels from the conveyor at preselected discharge or sorting stations. For example, the co-pending application of Richard L. Speaker entitled "CONVEYING APPARATUS INCLUDING TILTING SUPPORT STRUCTURES" which was filed on Apr. 10, 1972 with Ser. No. 242,330, discloses a high speed sorting device employing the tilting tray for carrying each of the parcels. At each discharge station, a trip mechanism is actuated to release a tray structure and permit the rapid discharge of the package into the chute structure.

Generally, the chute structure is provided with an enlarged opening including an upstream portion for guiding of the parcel or package into a lateral discharge chute. The enlarged opening is, of course, adapted to accommodate the high speed movement of the package and to minimize the preciseness with which the discharge from the conveyor must occur. Generally, the forward movement of the package causes it to move into engagement with the downstream wall which may also be cured to turn the parcel and cause it to move downwardly through and from the chute structure. The discharge end of the chute structure must, of course, be adapted to accept the widest parcel which will be handled by the sorting or conveying system. To minimize the space requirements, however, the discharge chute and the run-out conveyor or the like are made to just accommodate maximum sized parcels. In such devices, particularly at high speed, the parcel may move down through the discharge chute and into the discharge end adjacent to the run-out conveyor without properly turning. Under certain conditions, the parcel may lodge sideways within the discharge area of the chute. This is particularly true with intermediate size parcels which will lodge with the trailing edge of the leading end of the article adjacent to the downstream wall of the run-out conveyor and the leading edge of the trailing end or upstream end of the parcel lodged within or abutting the upstream wall of the discharge chute. This requires significant operating downtime or construction of an oversized chute in order to eliminate or significantly reduce load jamming. Further, in high speed sorters, employing tilting tray units and the like, the package or parcel is discharged by dropping of the tray to form an inclined discharge surface and the tray may advantageously be jogged to insure removal of the parcel. When the parcel is discharged into a chute structure, the parcel may tend to tumble or roll laterally into and through the chute structure. In handling of parcels and the like, such motion may be undesirable, particularly where the load content is fragile or unknown.

SUMMARY OF THE PRESENT INVENTION

The present invention is particularly directed to an improved discharge chute for receiving various sized parcels with the chute structure especially constructed to minimize and essentially eliminate any tendency of the parcels to lodge within the discharge chute and thereby permit continuous operation of high speed sorting and other conveying means.

In accordance with one particularly novel feature of the present invention, the base or floor portion of the discharge chute is formed with a plurality of offset plateaus or surfaces defining generally vertical wall portions intermediate the width of the discharge chute. The load engages such walls which serve to rotate or turn the parcel as it moves into and through the chute. The walls are suitably shaped to permit the larger boxes to ride up and over the wall onto the adjacent plateau while maintaining the improved turning action. It has been found that this significantly eliminates the problem associated with the jamming of the parcels within the discharge chute. In accordance with a further novel aspect and feature of the present invention, the leading or upstream wall is formed as curved wall including an infeed portion generally closely spaced to the conveying means and gradually attending downstream and laterally to the discharge end. The packages or parcels are received at the closespaced infeed portion and prevent undesirable tumbling and turning while maintaining a reliable guiding downwardly into the discharge end portion. Applicant has also found that the trailing or downstream side wall of the chute is desirably formed with an incline in the direction of travel such that the engagement of the side wall by the load tends to cause the leading end to ride up on the wall rather than jamming between the upstream and downstream walls.

In a particularly practical and novel embodiment of the present invention, the discharge chute structure is formed with the upper edge located immediately adjacent to the conveyor. It includes a leading or upstream wall which extends from one side of the receiving unit and curves upstream a significant length to define a gradually increasing receiving surface. The parcel is discharged onto such surface and is guided by the leading curved wall toward the central or downstream portion of the discharge chute. The downstream portion of the discharge chute is provided with a plurality and preferably a pair of raised plateaus with interconnecting turning walls between the plateaus and between the base and the first plateau with such walls inclined in the direction of the load movement. The turning walls are further angularly oriented from the conveying device in the direction of conveyor movement with the second downstream turning wall at a slightly lesser angle than the first turning wall. The downstream side wall is preferably formed as an inclined surface which is angularly oriented similar to the second turning wall.

The discharge chute may include a further novel feature for coupling of immediately adjacent discharge chutes. The downstream side wall is spaced from the conveying means with a continuous base wall adapted to be coupled with the correspondingly shaped in-feed end of an adjacent chute.

Applicant has found that the discharge chute of the present invention is particularly adapted to high speed automatic sorters with discharging of the parcels of other loads in a minimum amouant of space with respect to the longitudinal extent of the conveyor or the like.

BRIEF DESCRIPTION OF THE DRAWING

The drawing furnished herewith illustrates a preferred construction of the present invention in which the above advantages and features are clearly disclosed as well as other which will be readily understood from the following description thereof.

In the drawing:

FIG. 1 is a fragmentary view of a sorter mechanism including discharge chute structures constructed in accordance with the teaching of the present invention and viewing of the mechanism perpendicular to the base of the chute structure;

FIG. 2 is a diagrammatic illustration of a prior art chute structure;

FIG. 3 is a side elevational view taken generally on line 3—3 of FIG. 1;

FIG. 4 is a fragmentary sectional view taken generally on line 4—4 of FIG. 1;

FIG. 5 is a sectional view taken generally on line 5—5 of FIG. 1; and

FIG. 6 is a fragmentary sectional view taken generally on line 6—6 of FIG. 1.

DESCRIPTION OF THE ILLUSTRATED EMBODIMENT

Referring to the drawings and particularly to FIG. 1, an automatic sorting system is partially shown including a tilt tray sorting conveyor 1 for high speed movement of parcels 2 from a loading station, not shown, to a plurality of adjacent discharge stations, each of which includes a discharge chute structure or unit 3, 4 and 5 constructed in accordance with the teaching of the present invention. As units 3–5 are similarly constructed, unit 4 is shown in full and units 3 and 5 partially shown for purposes of explanation. The illustrated conveyor 1 includes a series of trays 6 which are adapted to support the parcel 2, such, for example, as encountered in a Post Office sorting system. The trays 6 are constructed with each half pivoted and latched in a transport position. Trip means 7 along the side of the tray path engages the latch mechanism for releasing a tray half and discharge of the parcel 2. Means 7 is adapted to be activated as the selected parcel approaches a selected discharge station, for example, as more clearly shown in the above identified application. In this manner, the several randomly received parcels 2 are discharged into the respective chute units 3–5 and sorted in a predetermined selected manner. To minimize space requirements, the parcels 2 are preferably discharged laterally from the conveyor 1 in the shortest possible longitudinal length with respect to the sorter. However, in high speed sortation systems, the parcels 2 will have a momentum characteristic and consequently a certain longitudinal length must be permitted to accommodate the rapidly discharging movements from the sorter. Further, the parcels 2 must be carefully laterally directed through the chute to a receiving means shown as a run-out conveyor 8.

Generally, each of the discharge stations and chutes 3-5 are similarly constructed and thus the single chute 4 is shown in detail and will be described in detail. Generally, the discharge chute 4 is constructed in accordance with the present invention to individually receive different sized parcels, shown super-imposed at 9, 10 and 11 and to direct them laterally onto run-out conveyor 8 which is located immediately beneath the discharge chute. The run-out conveyor 8 may be of any suitable construction such as an endless belt which will take the sorted parcels and deliver them to a suitable subsequent processing station.

Generally, the discharge chute includes a unique inclined base wall structure 12 adapted to receive and slidably support parcels 2 and 9–11 for gravity discharge onto the run-out conveyor. The chute 4 also includes a unique upstream curved side wall 13 defining a gradually turning infeed end for receiving and stabilizing of the packages and directing them downwardly with an improved motion into the discharge chute end for discharge onto the run-out conveyor. The high speed operation of the conveyor 1 will tend to move the parcels 2 onto the base wall 12 and into engagement with a downstream side wall 14 which is also shaped to direct the packages to the discharge end of the chute and onto the run-out conveyor 8.

In the illustrated embodiment of the invention, the upstream side wall 13 and the downstream side wall 14 are integrally formed with similar parallel discharge extension walls 15 overlying the run-out conveyor 8 to guide the parcels. The several parcels will generally vary from relatively small parcels to relatively large parcels and in the illustrated embodiment of the invention, as shown in FIG. 1. Large, intermediate and small sized parcels, 9, 10 and 11 are illustrated for purposes of more clearly explaining the functioning and operation of the present invention. The parcels are shown in phantom for clarity of illustration.

Before proceeding with the description of the illustrated embodiment of the invention, reference is made to an illustration of a typical prior art discharge chute 16 in FIG. 2 with a generally rectangular parcel 17 being discharged through the chute structure and jammed therein, Generally, the chute 16 includes a planar, inclined base wall 18, an angularly oriented upstream side wall 19 and a downstream side wall 20. An intermediate size parcel 17, as shown, may move downwardly through the discharge portion with the back corner 21 of the leading end of the parcel 17 moving into engagement with the downstream wall 20 just past the discharge point. The front or leading corner 22 of the trailing end of the parcel is shown abutting the upstream wall 19 immediately upstream of the discharge portion. In this position, the parcel 17 has a tendency to be jammed in position, clogging the chute structure and requiring manual correction. This may require stopping of the total system operation while the jammed parcel is removed. This would not only require the attendance of personnel but reduces the efficiency of the sorting system.

In accordance with the present invention, a preferred embodiment being shown in FIGS. 1 and 3 – 6, such jamming is avoided by unique construction of the wall means of the chute structure which promotes the turning movement of the parcel as it moves onto and through the chute. In particular in the illustrated embodiment of the invention, the inclined base wall 12 of the chute 4 is formed with a plurality of plateaus including a small-package plateau defined by the lowermost level extending from the upstream entrance end portion 23 of the chute 4 and connected to an intermediate plateau 24 located intermediate the width of the chute 4 and a final large package plateau 25 located immediately adjacent the downstream side wall 14. The illustrated chute 4 includes a relatively short, flat coupling edge 25a which is suitably secured in a position immediately adjacent to the conveyor 1. The small package plateau 23 extends along the complete length of the upstream wall 13. Plateau 23 includes a relatively narrow initial starting portion and extends longitudinally downstream enlarging gradually downwardly with the curved upstream wall 13 to the discharge end of the chute 4. Small packages may therefore move laterally and longitudinally from the conveyor 1 along wall 13.

The intermediate plateau 24 is connected to the small package plateau 23, as most clearly shown in FIG. 4 by an inclined, generally vertical step or wall 26. Although the connecting angle is not critical, Applicant in a practical application for post office parcel sorting has found that the wall 26 may conveniently be formed at a 45° angle. The wall 26 extends from the upper chute edge downwardly to the discharge edge. Plateau 24 is coupled or connected to the top receiving chute edge by a small inclined feed edge portion 27 which extends from the coupling conveyor outwardly to the plateau 24. Similarly, the discharge end of the plateau 24 drops to the discharge chute edge along an inclined discharge portion or extension 28 to provide for smooth transfer of parcels onto and from the plateau 24 at the corresponding locations. The plateau 24 and connecting wall 26 is also angularly oriented in the direction of the movement of the conveyor 6 at an obtuse angle with respect to the upstream discharge edge and path of conveyor 1, as shown in FIG. 1. In the illustrated embodiment, wall 24 is shown forming an angle of essentially 120° with respect to the upstream portion of conveyor 1. An intermediate or larger parcel 10 or 11 moves across the lower plateau 23 into engagement with the wall 26 and onto the intermediate plateau 24. The inclined and angularly oriented wall 26 will effect a turning action on the parcel but will not prevent the movement of the parcel down through the chute. If the parcel is a large parcel 11, it will move from the intermediate size plateau 24 onto the large plateau 25, in generally the same manner. Thus, the large plateau 25 is similarly connected to the intermediate plateau 24 by a similar vertical inclined wall 29 which is also angularly oriented with respect to the conveyor and the discharge path. The angle of wall 29 is somewhat more sharp or steep. In the illustrated embodiment of the invention, the wall 29 is shown forming an angle of approximately 110°. The plateau 25 is further coupled to the chute coupling edge and to the discharge edge by inclined infeed and discharge portions. As a large parcel 11 moves over the intermediate plateau 24 and into engagement with the vertical wall 29, a further turning action is exerted on the parcel as it moves up and over wall 29. Once again, the wall 29 does not unduly interfere with the downward sliding movement through the chute but does exert a continuous turning action thereon.

The downstream side wall 14 is also inclined in the downstream direction of the conveyor as a smooth, continuous extension of the plateau 25 and extends upwardly and downstream. If a small or intermediate parcel 11 is moving with sufficient force, it will move onto the plateau or the leading end at least and move into engagement with the downstream side wall 14 of the chute 4.

The downstream side wall 14 has its lower connecting end generally parallel to the vertical joining wall 29 of the large parcel plateau 25. The downstream side wall 14 is spaced downwardly from the conveyor coupling edge and includes a front wall 30 generally parallel to the conveyor 1 and in alignment with the top inclined feed portion 27 of plateaus 24 and 25. The chute 4 has a bottom wall portion 31 which extends upwardly from wall 30 to the conveyor mounting edge and which defines a continuing surface to the adjacent chute 3. The front wall 30 and portion 31 thus form an extension from the chute structure to the infeed end of the adjacent chute 3. Wall 30 is slightly inclined upwardly as shown most clearly in FIG. 3 to merge with the upstream side wall 13 of chute 3.

The end portion of the extension 31 and front wall 30 is offset by approximately the thickness of the chute material to overlap with the next downstream chute 3 and particularly the leading or upstream edge thereof, as at 32.

The upstream side wall 13 has a short lead-in portion 32a which is generally inclined in accordance with wall 30 of the adjacent chute to form a smooth, continuous extension thereof with the infeed portion initially of a length corresponding to the ledge portion of the preceding chute. The side wall 13 curves downstream and laterally in a smooth, continous large radius with the incline portion of the wall maintained perpendicular to the base, as shown in FIG. 6. The side wall 13 is coupled to the base 23 with the lower joining end offset inwardly as at 33 from the principal plane of side wall 13, as shown in FIG. 6. The leading side wall 13 immediately adjacent to the discharge end is provided with a relatively flat segment 34 joining the curved wall to the flat vertical wall 15 adjacent to the run-out conveyor 8. In operation, the sorter conveyor 1 is operated in the normal manner to selectively discharge the various sized parcels 2, and 9–11 onto the selected discharge chute 3 – 5. The conveyor 1 is actuated to trip the discharge mechanism slightly upstream of the infeed end of the chute 4, for example. The small parcel 9 will tend to move laterally, rapidly onto the leading side wall 13 and follow the same along base wall 23 into the discharge area and onto the run-out conveyor.

The wall 13 is closely spaced to the sorter 1 and particularly trays 6. As the tray 6 is dropped, as shown in FIG. 3, the parcel 2 drops therefrom. Although shown in FIG. 1 on one side of the tray 6, the parcel 2 may and generally will be centrally located. When the tray 6 is tilted, the parcel 2 may tend to roll or tumble therefrom onto the chute structure 4. In the illustrated embodiment, a parcel so discharged moves almost immediately into engagement with the wall 13 which prevents the tumbling action and simultaneously directs it downwardly through the chute structure. The wall 13 acts to immediately stabilize the parcel for movement through the chute.

Further, for intermediate and larger size parcels of a box-like configuration, the curved wall presents an area of minimum contact intermediate the length thereof which will facilitate the movement and turning within the infeed portion of the chute structure.

Also, with such larger packages, the outer portions may during the movement through the infeed portion remain in engagement with the adjacent portion of tray which will further facilitate turning into the chute structure.

Thus, the unique curved infeed side wall 13 has been found to significantly contribute to reliable discharge of parcels, and in other than very high speed sorting systems, may be employed with a single plane base. The multiple plateau base wall particularly in combination with the curved lead-in wall produces superior discharge for higher speed conveying systems.

Thus, an intermediate size parcel 10 will also tend to move in a similar manner along the side wall 13 but the leading edge or portion necessarily moves into engagement with the inclined and angularly oriented connecting wall 26 to the intermediate plateau 24. The angular orientation and the vertical extent thereof effects a distinct turning action on the parcel 10 and thereby directing it downwardly through the chute as desired. If the parcel is a large parcel 11 or if the small or intermediate parcel has sufficient momentum so as to move onto the large plateau 25, the second angularly oriented and inclined connecting wall 29 similarly further turns the parcel as it moves upwardly onto the large plateau and again redirected the parcel downwardly through the chute and onto the run-out conveyor 8. If, by any chance, the parcel moves into engagement with the downstream wall 14, the incline thereat permits movement upwardly on the wall to thereby redirect the parcel toward the discharge point and onto the run-out conveyor 8.

Applicant has found that the motion of the parcel riding up over a stepped or offset base wall portion produces a highly desirable turning action and significantly reduces the tendency of a parcel to jam within the discharge end of the chute. As a result, the run-out portion of the discharge assembly can be made of a minimal width and such as to accommodate the largest sized package. Further, the inclined downstream side wall significantly minimizes the jamming characteristic. In fact, an improved chute structure is obtained with either one of the stepped base wall or the inclined downstream wall alone.

The stepped base wall construction is particularly desirable with widely varying sized parcels and particularly in very high speed sorters where the movement of the package is such that the forces can more readily create a jammed parcel condition.

The present invention thus has provided a relatively simple construction with significant improvement in the reliable, lateral discharge of parcel and other load members.

Various modes of carrying out the invention are contemplated as being within the scope of the following claims, particularly pointing out and distinctly claiming the subject matter which is regarded as the invention.

I claim:

1. A discharge chute having an upper end adapted to be located adjacent a side of a conveying means moving past the chute and defining an upstream side and a downstream side of the chute for receiving a load moving sideways from the conveying means and having a lower end, comprising an inclined base wall having an upper receiving end and a lower discharge end for directing of the load downwardly to said discharge end of the chute, said base wall including a plurality of spaced plateaus extending between the upper wall end and lower wall end and spaced across the chute and interconnected to each other by a connecting wall for turning a load moving downwardly and across said base wall by engagement with said connecting wall which effects a turning of the load downwardly toward the discharge end, said connecting wall being angularly oriented with respect to said receiving end and discharge end of the base wall and with respect to the path of the conveying means.

2. The apparatus of claim 1 wherein said plateaus are spaced from each other and said connecting wall is inclined.

3. The apparatus of claim 1 wherein said chute structure includes a downstream sidewall extending upwardly from said base wall and inclined outwardly from said base wall.

4. The apparatus of claim 1 wherein said base wall includes a leading upstream portion of a relatively short lateral extent from the upper receiving end, said portion extending downstream with an increasing depth from the receiving end toward said discharge end of the base wall.

5. The apparatus of claim 1 wherein said chute structure is adapted to accommodate small, intermediate and large size parcels and including a leading small parcel bottom plateau extending throughout at least 50% of the total width of the base wall adjacent the discharge end, an intermediate plateau located immediately downstream from the small package plateau and connected thereto by an inclined connecting wall, and a large parcel plateau immediately downstream of the intermediate plateau and connected thereto by an inclined connecting wall.

6. A discharge chute apparatus for receiving a load from a high speed conveying apparatus moving along a path to define an upstream side and a downstream side and having a means for laterally moving of the load from the conveying apparatus onto the chute, comprising an inclined bottom wall having an upper receiving end and a lower discharge end to receive a load moving downwardly and across from one side to the opposite side on the bottom wall, a downstream side wall and an upstream side wall connected to the opposite sides of the bottom wall, said upstream side wall being a downwardly curving member defining an upstream entrance base wall portion of a relatively short lateral extent and extending downstream with an increasing downward extent to define an increasing lateral discharge portion for directing of the load downwardly to said discharge end of the chute, said lateral discharge portion including a plurality of plateaus extending between the receiving and discharge ends and being spaced from each other and interconnected to each other by inclined connecting walls whereby a load moving down and across said bottom wall moves into engagement with said connecting walls and is positively turned downwardly toward the discharge end.

7. The apparatus of claim 6 wherein said connecting walls are angularly oriented between the receiving end and the discharge end with respect to the downward movement of the load.

8. The apparatus of claim 7 wherein said plateaus are connected to the incoming top edge of the chute and to the bottom discharge edge of the chute by inclined ledge portions.

9. The apparatus of claim 7 wherein said downstream side wall is inclined and extends downstream of said bottom wall.

10. The apparatus of claim 7 wherein said chute structure is adapted to accommodate small, intermediate and large size parcels and includes a leading plateau in the plane of entrance base wall portion, an intermediate plateau located immediately downstream from and above the small package plateau, a trailing plateau immediately downstream of and above the intermediate plateau, said intermediate and trailing plateaus being of similar widths.

11. The chute apparatus of claim 10 wherein the leading plateau extends throughout at least 50% of the total width of the lateral discharge portion.

12. The apparatus of claim 10 wherein said connecting wall between the leading and intermediate plateau being angularly oriented at an angle of approximately 60°.

13. The apparatus of claim 12 wherein said trailing plateau and connecting wall are angularly oriented with respect to the discharge end of the chute structure by essentially 70°.

14. The apparatus of claim 10 wherein said downstream wall is spaced from the receiving end and includes a front wall extending generally downwardly of the chute structure, said front wall being inclined downwardly from an upper edge of the chute structure, the trailing most side portion of the chute structure being adapted to overlap with the leading side of a corresponding second chute structure to define a continuous continuation of an infeed portion to the second chute structure.

15. The chute apparatus of claim 10 wherein the leading wall portion defines a generally vertical wall structure extending generally normal to the base of the bottom wall of the chute structure and including an angle of essentially 90°, the lowermost portion of said vertical wall being offset slightly to define a lesser inclusive angle, said leading wall having an extension from the discharge end including an outwardly laterally extended wall portion extending outwardly and laterally in the upstream direction from the run-out means portion and a generally vertical wall portion extending therefrom.

16. The apparatus of claim 10 wherein said structure if formed of a molded fiber glass with the bottom wall and the upstream wall and the downstream wall integrally formed as a single unitary element.

17. The apparatus of claim 7 having said downstream wall connected with the downstream edge of the trailing plateau and extending essentially parallel to the connecting wall of said trailing plateau, said downstream wall extending upwardly and downstream from said plateau at a relatively steep angle.

18. A parcel turning discharge chute apparatus for receiving a load from a conveying means having means to move the load sideways from moving support travelling from an upstream to a downstream path of the conveying means, said apparatus comprising a base wall for receiving a load which moves downwardly and across the base wall and having an upstream wall and a downstream wall secured to the opposite sides of said base wall, said base wall having a mounting means to locate the base wall in an inclined plane arrangement with an upper mounting edge adapted to be located adjacent the longitudinal run of the conveying means and inclined downwardly to a run-out edge, said upstream wall being secured to the base wall in downwardly spaced relation to said upper edge and extending downstream from the upstream side and downwardly of the upper edge as a continuous curved wall member to define generally minimum entrance area adjacent the upstream side and expanding downwardly to the run-out edge, said downstream wall being secured to the downstream side of the base wall and inclined downstream therefrom and including a front wall extending generally parallel to the upper mounting edge and in downwardly spaced relation to said upper mounting edge with a connecting wall extending therebetween, said upstream wall and said downstream wall terminating in generally parallel sidewall extensions below the run-out edge of the base wall, said parallel sidewall extensions defining a guide for the maximum size parcel for discharge through the chute structure, said base wall including a base plateau and a pair of raised plateau surfaces including a first maximum raised large surface immediately adjacent said downstream wall and including an intermediate planar portion extending from the front wall of said downstream wall and terminating in upwardly spaced relation to the run-out edge of said base wall, said planar portion being connected to the upper edge and to said run-out edge by inclined plane surfaces, said second plateau being formed immediately upstream of said first plateau and connected thereto by a first inclined wall which extends throughout the planar portion and the opposite inclined end portions of the first plateau, said second plateau being joined to the base plateau by a second inclined wall, and said second inclined wall being differently angularly oriented with respect to the upper edge than said first inclined wall and with said second inclined wall defining a greater inclusive angle between the inclined walls and the mounting edge.

19. The chute apparatus of claim 18 wherein said base wall, upstream wall and downstream wall are formed as a continuous reinforced fiber glass plastic element including a reinforcing bar secured to beneath the lower edge immediately upwardly from the discharge edge, said downstream portion of the chute apparatus including a connecting portion generally of a extent corresponding to the configuration of the upstream infeed portion and being offset upwardly by essentially the thickness of the plastic to provide direct overlap with the initial base wall and upstream wall of a corresponding chute member to thereby maintain a continuous infeed portion from an upstream chute to an immediately adjacent downstream chute.

20. A parcel turning discharge chute means for receiving a load from a conveying means having means to move the load sideways from a moving support travelling from an upstream to a downstream path of the conveying means, said apparatus comprising a base wall and interconnected upstream wall and a downstream wall, said base wall having mounting means to locate the base wall in an inclined plane arrangement with an upper mounting edge adapted to be located adjacent a longitudinal run of a conveying means and a laterally spaced bottom run-out edge, said upstream wall being secured to the base wall in downwardly spaced relation to said upper edge and extending from the upstream edge downstream and outwardly of the mounting edge as a continuous curved wall member to define a close-spaced stabilizing wall portion adjacent the conveying means with a generally continuous guide wall to the run-out edge of the chute, and said upstream wall extending essentially normal to the base wall and having a short upstream entrance portion extending upwardly and outwardly from the base wall to form an inclined lead-in portion to said normal portion.

21. The apparatus of claim 20 wherein an inclined side wall portion connects said upstream wall to the base wall.

22. The apparatus of claim 20 wherein said downstream wall being angularly oriented downstream of the conveying run and secured to the downstream end of the base wall and being inclined downstream from said base wall.

23. The apparatus of claim 22 wherein said downstream wall includes a front wall extending generally parallel to the upper mounting edge and in downwardly spaced relation to said upper mounting edge and connected by a continuation of the base wall.

* * * * *